(12) United States Patent
Heenen

(10) Patent No.: US 11,117,241 B2
(45) Date of Patent: Sep. 14, 2021

(54) PLIERS HAVING TWO PLIERS HANDLES

(71) Applicant: KNIPEX—Werk C. Gustav Putsch KG, Wuppertal (DE)

(72) Inventor: Matthias Heenen, Bottrop (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 602 days.

(21) Appl. No.: 16/074,188

(22) PCT Filed: Feb. 1, 2017

(86) PCT No.: PCT/EP2017/052091
§ 371 (c)(1),
(2) Date: Jul. 31, 2018

(87) PCT Pub. No.: WO2017/134069
PCT Pub. Date: Aug. 10, 2017

(65) Prior Publication Data
US 2021/0138612 A1    May 13, 2021

(30) Foreign Application Priority Data
Feb. 4, 2016  (DE) .................... 10 2016 101 926.7

(51) Int. Cl.
*B25B 7/02*    (2006.01)
*B25B 7/08*    (2006.01)
(Continued)

(52) U.S. Cl.
CPC .................. *B25B 7/02* (2013.01); *B25B 7/08* (2013.01); *B23D 29/026* (2013.01); *B25B 7/22* (2013.01)

(58) Field of Classification Search
CPC ........... B23D 29/026; B25B 7/02; B25B 7/08; B26B 17/00; B26B 17/006; B26B 17/02
(Continued)

(56) References Cited

U.S. PATENT DOCUMENTS

| 1,346,983 | A | | 7/1920 | Shaffer | |
|---|---|---|---|---|---|
| 2,523,385 | A | * | 9/1950 | Mead | ..................... B25B 7/123 81/370 |

(Continued)

FOREIGN PATENT DOCUMENTS

| DE | 1 016 199 B | 9/1957 |
|---|---|---|
| DE | 1 086 189 B | 7/1960 |

OTHER PUBLICATIONS

International Search Report of PCT/EP2017/052091, dated Apr. 7, 2017.

*Primary Examiner* — Joseph J Hail
*Assistant Examiner* — Arman Milanian
(74) *Attorney, Agent, or Firm* — Collard & Roe, P.C.

(57) ABSTRACT

Pliers have two pliers handles guided such that they cross one another in a joint region having a stationary joint bolt. Gripping regions are formed on the pliers handles on one side of the joint region, and working regions are formed on free ends of the pliers handles on the other side, said working regions extending to form a pliers jaw. The working regions have first and second toothed regions that come into contact when the pliers jaw is closed. In the first toothed region, in a sequence in the longitudinal extension of the pliers handle, the tooth tips end in a surrounding surface that is flat in the longitudinal section and in contact with same, and the tooth tips of the opposing second toothed region end in a surrounding surface that is convex in the longitudinal section and in contact with same.

5 Claims, 8 Drawing Sheets

(51) Int. Cl.
*B23D 29/02* (2006.01)
*B25B 7/22* (2006.01)

(58) Field of Classification Search
USPC ............ 81/186, 370, 418, 426, 424.5, 426.5
See application file for complete search history.

(56) References Cited

U.S. PATENT DOCUMENTS

| | | | | |
|---|---|---|---|---|
| 2,733,624 | A * | 2/1956 | Dowidat | B25B 7/123 |
| | | | | 81/380 |
| 2,847,889 | A * | 8/1958 | Cain | B25B 7/02 |
| | | | | 81/424.5 |
| 7,114,208 | B1 * | 10/2006 | Borst | B25B 7/02 |
| | | | | 7/108 |
| 2007/0056412 | A1 * | 3/2007 | Wolfson | B25B 7/02 |
| | | | | 81/415 |

\* cited by examiner

PLIERS HAVING TWO PLIERS HANDLES

CROSS REFERENCE TO RELATED APPLICATIONS

This application is the National Stage of PCT/EP2017/052091 filed on Feb. 1, 2017, which claims priority under 35 U.S.C. § 119 of German Application No. 10 2016 101 926.7 filed on Feb. 4, 2016, the disclosures of which are incorporated by reference. The international application under PCT article 21(2) was not published in English.

TECHNICAL FIELD

The invention relates to pliers having two pliers handles, which are guided such that they cross each other in a joint region having a stationary joint bolt, the gripping regions being formed on the pliers handles on one side of the joint region and working regions being formed on free ends of the pliers handles, which working regions complement each other to form a pliers jaw, the working regions further having first and second toothed regions that come into contact when the pliers jaw is closed and the opposing first and second toothed region are formed differently in the longitudinal extent thereof.

PRIOR ART

Pliers of the kind in question are known, for example as so-called combination pliers or flat pliers. The toothed regions of the pliers jaws facing each other serve, for example, for gripping a workpiece or also a screw head or a screw nut.

Well-known formations have first and second toothed regions, which, in particular when viewed in the closing position of the pliers jaw, have the same shape and are aligned parallel to each other with respect to their active surfaces spanned by the tooth tips. Moreover, pliers are known in which one of the toothed regions is shaped differently from the other toothed region, in particular with regard to the alignment and/or the course of the surrounding surfaces connecting the tooth tips.

SUMMARY OF THE INVENTION

In view of the known prior art, a technical problem of the invention is seen in further improving pliers of the type in question in an advantageous manner, in particular with regard to the configuration of the first and/or second toothed regions.

A possible solution to the object of the invention according to a first inventive idea is provided by pliers with which it is targeted that in the first toothed region, as viewed in a sequence in the longitudinal extent of the pliers handle, the tooth tips end in a surrounding surface that is flat in the longitudinal cross-section and in contact with same, and that the tooth tips of the opposing second toothed region end in a surrounding surface that is convex in the longitudinal cross-section and that is in contact with same.

In accordance with this configuration, pliers are specified, by means of which, by using the first and second toothed regions of the pliers jaws, secure gripping is possible, in particular of sheet-like workpieces or the like. With respect to their tooth tips, the teeth of both toothed regions run in first instance and substantially preferably transverse to a longitudinal extent of the working region as a whole. The teeth and, moreover, the tooth gaps between the teeth can further preferably be identical in terms of their longitudinal cross-sectional design over the entire toothed region. In a preferred configuration, this also applies to the teeth and tooth gaps of the opposite toothed region, taking into account the overall convex arrangement of the teeth. In a preferred configuration, this enables the tooth tips of the one toothed region to extend into the tooth gaps of the other toothed region in the closing position of the pliers jaw.

Due to the flat shape of the surrounding surface contacting the tooth tips of the first toothed region, the engagement of all tooth tips of the first toothed region on the workpiece surface can be achieved when gripping, for example, a sheet-shaped workpiece with a flat surface facing it. The surface of the workpiece opposite this surface is gripped by one or more tooth tips of the second toothed region, in particular due to the arrangement of the tooth tips along the convex surrounding surface. In the case of workpieces, e.g. sheets with a thickness, as viewed perpendicular to the longitudinal extent of the working regions, which is selected to be adapted to the pliers jaws configuration (e.g. up to 10 mm), this results in a vertical force component in a longitudinal cross-section of the point of contact of the convex surrounding surface of the second toothed region acting towards the first toothed region on the associated surface of the workpiece, which force component acts on the flat surrounding surface which is limited in the longitudinal extent by the respective outer tooth tips. Accordingly, there is no tilting moment on the workpiece at least up to a given material thickness. Rather, a safe, tilt-free gripping of the workpiece is made possible by the described configuration of the first and second toothed regions.

More preferably, the surrounding surfaces (flat and convex) can penetrate each other in the closing position of the pliers or the closing position of the pliers jaw, namely as a result of the at least partial meshing of the teeth.

In addition, as further preferred, one surrounding surface, more preferably both surrounding surfaces, can planarly extend transversely to the longitudinal extent of the pliers handles or the working regions in an associated cross-section, so that with respect to the convex surrounding surface in the longitudinal cross-section, the surrounding surface substantially represents a section of a three-dimensional circular cylinder surface.

Further features of the invention are described below, also in the description of the figures, often in their preferred association with the subject matter of claim 1 or features of further claims. However, they may also be of importance in association with only individual features of claim 1 or of the respective further claim or in each case independently.

Thus, in the course of closing the pliers, a contact line resulting between the surrounding surfaces can be offset with respect to a beginning of the toothing towards the free end of the pliers handle. The toothing of both the first and the second toothed regions has a beginning facing the free end of the working region or the pliers handle and end facing the joint region. The contact line resulting from contact of the convex and flat surrounding surfaces and extending transversely to the longitudinal extent of the pliers handle is preferably given in a region which, viewed from the beginning of the toothing, is spaced apart from this beginning in the direction of the end of the toothing. The spacing in this respect can correspond to a tenth up to a half, further, for example, a quarter or a third of the extent of the toothing between the beginning and the end of the latter.

Also, with regard to a longitudinal extent of the pliers jaw member, the point of the convex surrounding surface which protrudes furthest towards the opposite working region when the surrounding surfaces of the first and the second toothed regions come into contact with one another in a longitudinal cross-section can be arranged approximately in the middle of the second toothed region. This can also result in a configuration in which a force component introduced into a workpiece to be gripped via the second convexly shaped toothed region, taking into account a maximum permissible thickness of the workpiece to be gripped, acts on a flat region starting from the beginning of the toothing of the first toothed region up to approximately three quarters of its longitudinal extent. The point of the convex surrounding that protrudes furthest towards the opposite working region when the surrounding surfaces come into contact must not necessarily be the point of contact of the surrounding surfaces with respect to a longitudinal cross-section.

In the direction of the free ends of the pliers handles upstream of the first and second toothed regions, third and fourth toothed regions may be formed which are separated from the first and second toothed regions by a hole structure that is given when the pliers jaw is closed. This given hole structure can be e.g. a pin gripping hole, e.g. for the detection of wire-like workpieces with a diameter of 1.5 mm upwards.

Thus, this results in two gripping zones that are arranged one behind the other in the longitudinal extent of the pliers jaw members and are separated by the hole structure, one of which has the aforementioned configuration with a toothed flat region and an opposite toothed convex region. These (first and second) regions can be the gripping regions closer to the joint region.

The gripping zone, formed by the third and fourth toothed region, is preferably formed at the end or the tip of the pliers jaw members.

In a possible configuration, the tooth tips of the third and fourth toothed regions each end in a surrounding surface that contacts the tooth tips and is flat in longitudinal cross-section. In a closed position of the pliers jaw, these surrounding surfaces preferably extend approximately parallel to each other. Also, a penetration of the surrounding surfaces in the closed position of the pliers jaw can be given here as a result of the meshing of the teeth of the opposing regions.

In addition, the extension of the third or fourth toothed region of the flat surrounding surface in the longitudinal extent of the pliers jaw member can transition into the flat surrounding surface of the first toothed region.

The flat surrounding surface of the other third or fourth toothed region, when extended, can transition tangentially in the longitudinal extent of the pliers jaw member into the convex surrounding surface of the second toothed region.

Also, the tooth tips of the third toothed region can end in a flat surrounding surface contacting them and the tooth tips of the fourth toothed region can end in a convex surrounding surface contacting them.

Here, the convex surrounding surface can have the same radius of curvature as that of the second toothed region, alternatively a larger or smaller radius compared thereto.

It may be that only one gripping region, consisting of first and second regions or third and fourth regions, is provided with a convex surrounding surface in the region of a toothing. Alternatively, both gripping regions can be provided in each case with a flat and a convex surrounding surface, wherein the toothing with identical surrounding surfaces does not necessarily have to be formed on the same pliers jaw member.

With respect to an axis of symmetry of the pliers, which passes through the geometric joint axis of the joint region and towards which axis of symmetry the working regions of the pliers handles can be moved towards each other, the convex surrounding surface of the second toothed region may be formed in a closed position of the pliers jaw so as to run tangentially into the axis of symmetry in the direction of the free end of the pliers jaw member and/or in the direction of the given hole structure separating the first and second toothed regions from possible third and fourth toothed regions.

BRIEF DESCRIPTION OF THE DRAWINGS

The invention is explained below with reference to the accompanying drawings, which, however, only illustrates exemplary embodiments. A part that is explained only with reference to one of the exemplary embodiments, and in a further exemplary embodiment is not replaced by another part due to the special feature emphasized therein, is therefore also described for this further exemplary embodiment as a part which in any case is potentially present. In the figures.

DESCRIPTION OF THE EMBODIMENTS

Figure 1:
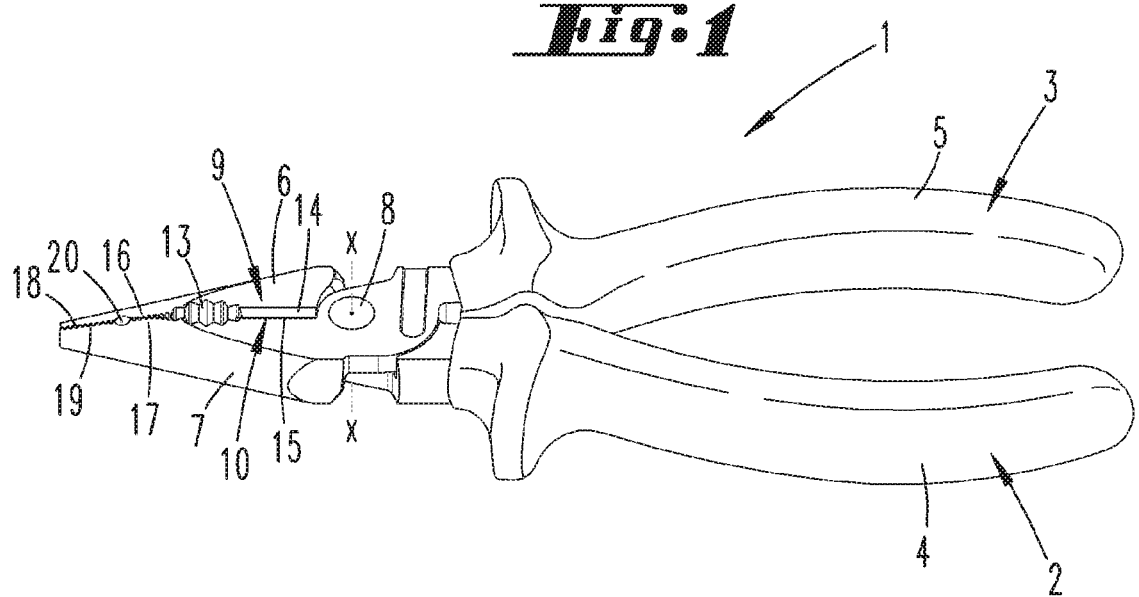
FIG. 1 shows a perspective illustration of pliers of the kind in question in a first embodiment.
Figure 8:
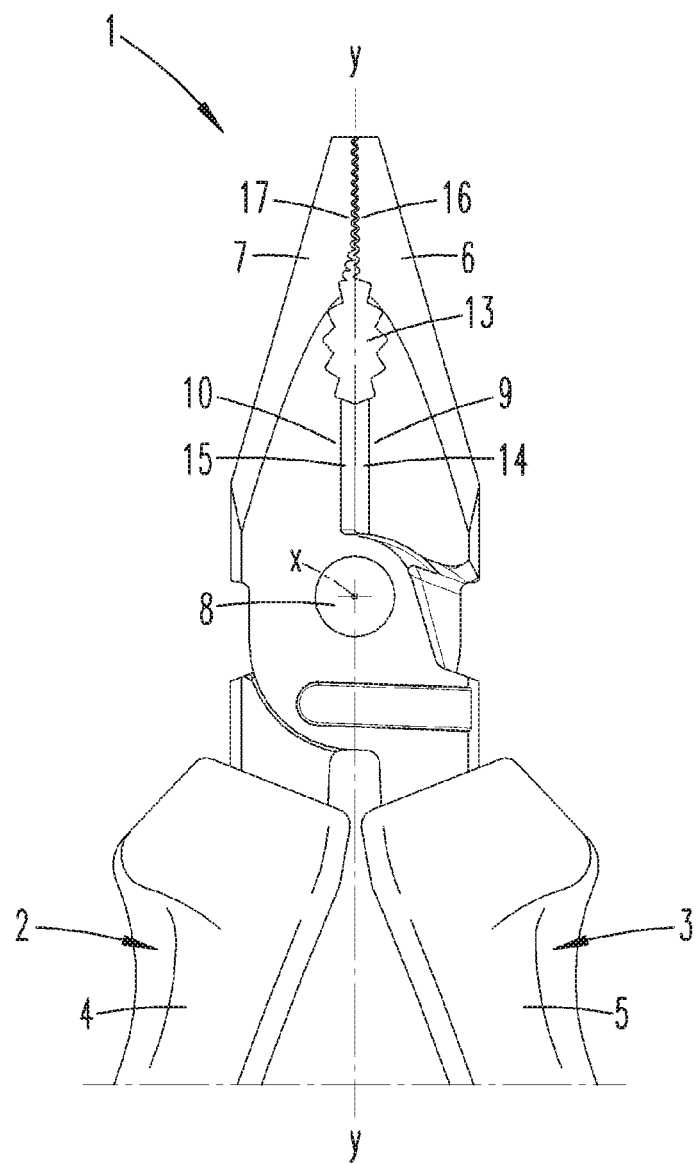
FIG. 8 shows an illustration corresponding to FIG. 2, regarding pliers in a second embodiment.
Figure 9:
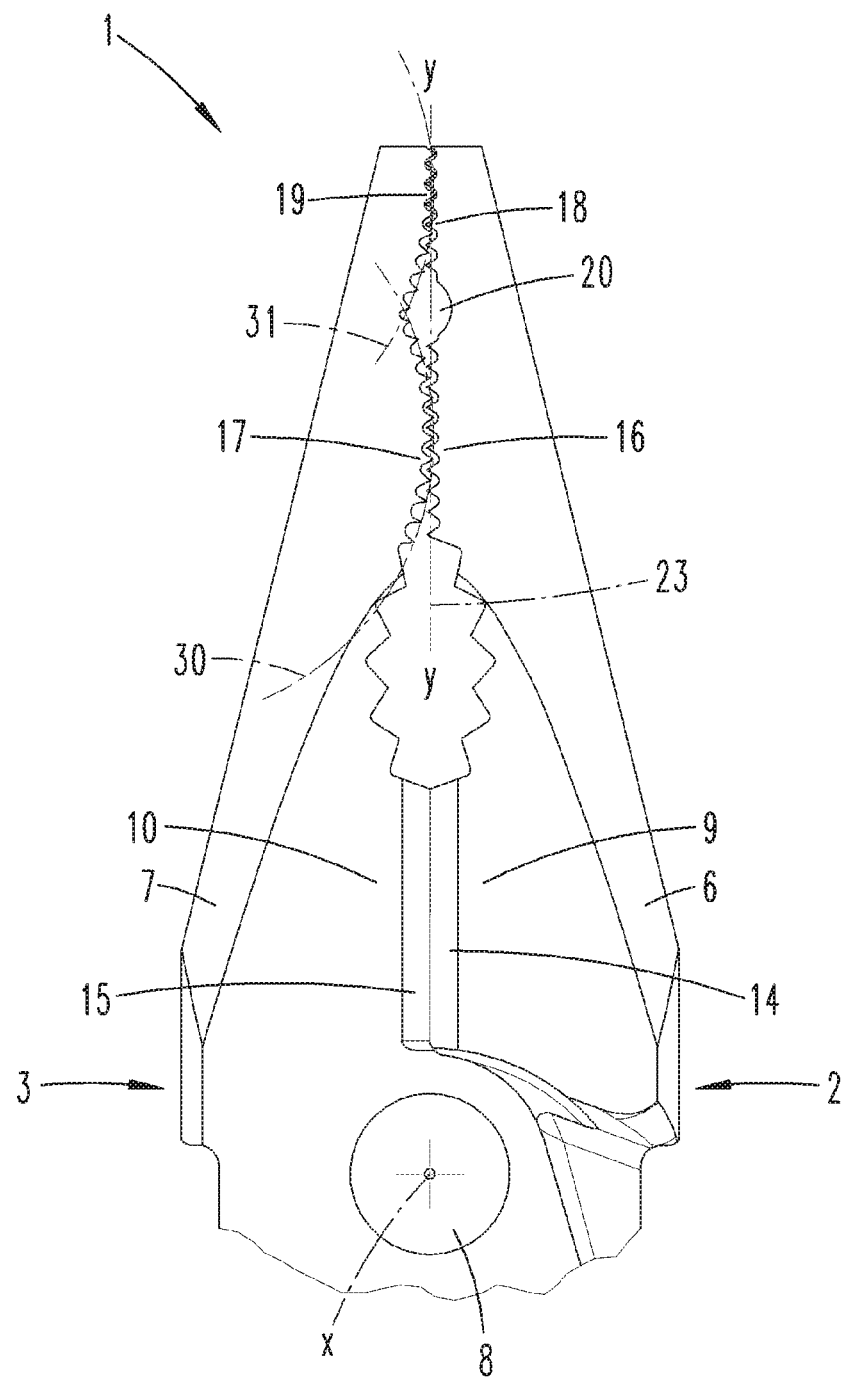
FIG. 9 shows an illustration corresponding to FIG. 3, regarding a third embodiment.

Shown and described in first instance with reference to FIG. 1 are pliers 1. The latter are formed as combination pliers in the first exemplary embodiment illustrated in FIGS. 1 to 7. The following versions refer not only to such combination pliers, but also to other pliers with which a workpiece 11, in particular a plate-like or sheet-like workpiece, can be gripped. Examples are shown in FIGS. 8 and 9, regarding further embodiments of combination pliers.

The pliers 1 have two pliers handles 2, 3 arranged crosswise to each other. Here, each pliers handle 2, 3 forms a gripping handle 4, 5, which, beyond the crossing region and joint region of the pliers handles 2, 3 transitions into a pliers jaw member 6, 7.

The gripping handle 4 and the pliers jaw member 6 form the pliers handle 2; the gripping handle 5 and the pliers jaw 7 form the pliers handle 3.

The fixed joint is given by a joint bolt 8. The latter extends through the pliers handles 2, 3 in the transition region from the respective gripping handle into the pliers jaw member.

The geometric joint axis x simultaneously forming the body axis of the joint bolt 8 extends perpendicular to a plane in which the pliers handles 2, 3 move when the pliers 1 are actuated.

The pliers 1 are largely symmetrical with respect to a symmetry axis y running through the joint axis x, towards which the working regions 9, 10 of the pliers handles 2, 3 can be moved with respect to each other. In the case of the pliers 1 of the embodiment according to the illustration in FIG. 9, the symmetry refers only to the pliers jaw member region.

The working regions 9 and 10 of the pliers 1 according to the embodiments in FIGS. 1 to 8 are substantially divided into a flat pliers portion associated to the free end of the pliers jaw members 6, 7 and a side cutter portion associated with the region at the joint bolt. The flat pliers portion and side cutter portion are separated by a hole-like gripping structure 13 which is given when the pliers jaw M is closed. The hole structure is also referred to as burner hole, in particular for gripping workpieces with a diameter from about 5 mm upwards.

Between this gripping structure 13 and the ends facing the joint bolt 8, the working regions 9 and 10 are formed as cutting edges 14 and 15 to form the side cutter portion.

In the first exemplary embodiment (FIGS. 1 to 7), first and third toothed regions 16 and 18 are formed extending from the gripping structure 13 in the region of the pliers jaw member 6 towards the free ends of the pliers handles 6 and 7, and second and fourth toothed regions 17 and 19 are formed on the opposing pliers jaw member 7.

The first and second toothed regions 16 and 17 are separated from the toothed regions 18 and 19 arranged upstream towards the free ends of the pliers jaw members 6 and 7 by a hole structure 20 which results from closing the pliers jaw M.

In the exemplary embodiment according to the illustration in FIG. 8, the flat pliers portion is given by the regions 16 and 17 alone. Further regions 18 and 19 as well as a hole structure 20 are not given.

Similar to the embodiment according to FIG. 8, the working regions 9 and 10 of pliers 1 are also formed in the embodiment illustrated in FIG. 9, although the respective working region, extending from the gripping structure 13 in the direction of the joint bolt 8, forms a further toothed region 26, 27.

The toothed regions have individual unidirectional teeth 21. Their tooth tips 22 extend in a line-type manner transverse to the longitudinal extent of the pliers jaw members 6, 7. The tooth tips 22 are evenly spaced apart from one another when viewed in the longitudinal extent of the pliers jaw members 6, 7. Opposite tooth regions are formed and aligned in such a manner that in a closing position of the pliers jaw, e.g. according to the illustration in FIG. 3, the teeth 21 can mesh and thus can extend accordingly beyond the axis of symmetry y.

Figure 3:
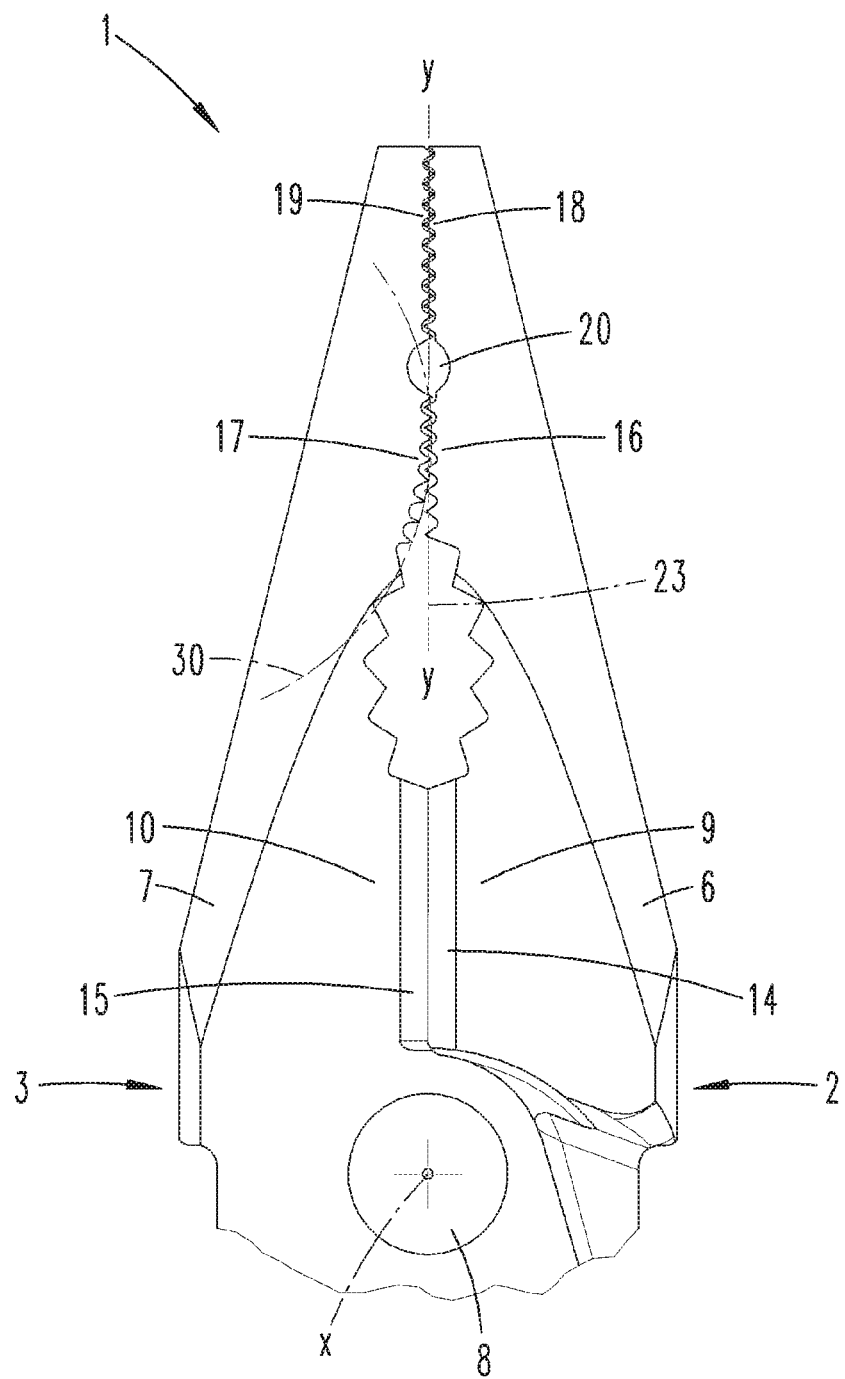
FIG. 3 shows an enlarged detail of the region III in FIG. 2.
Figure 4:
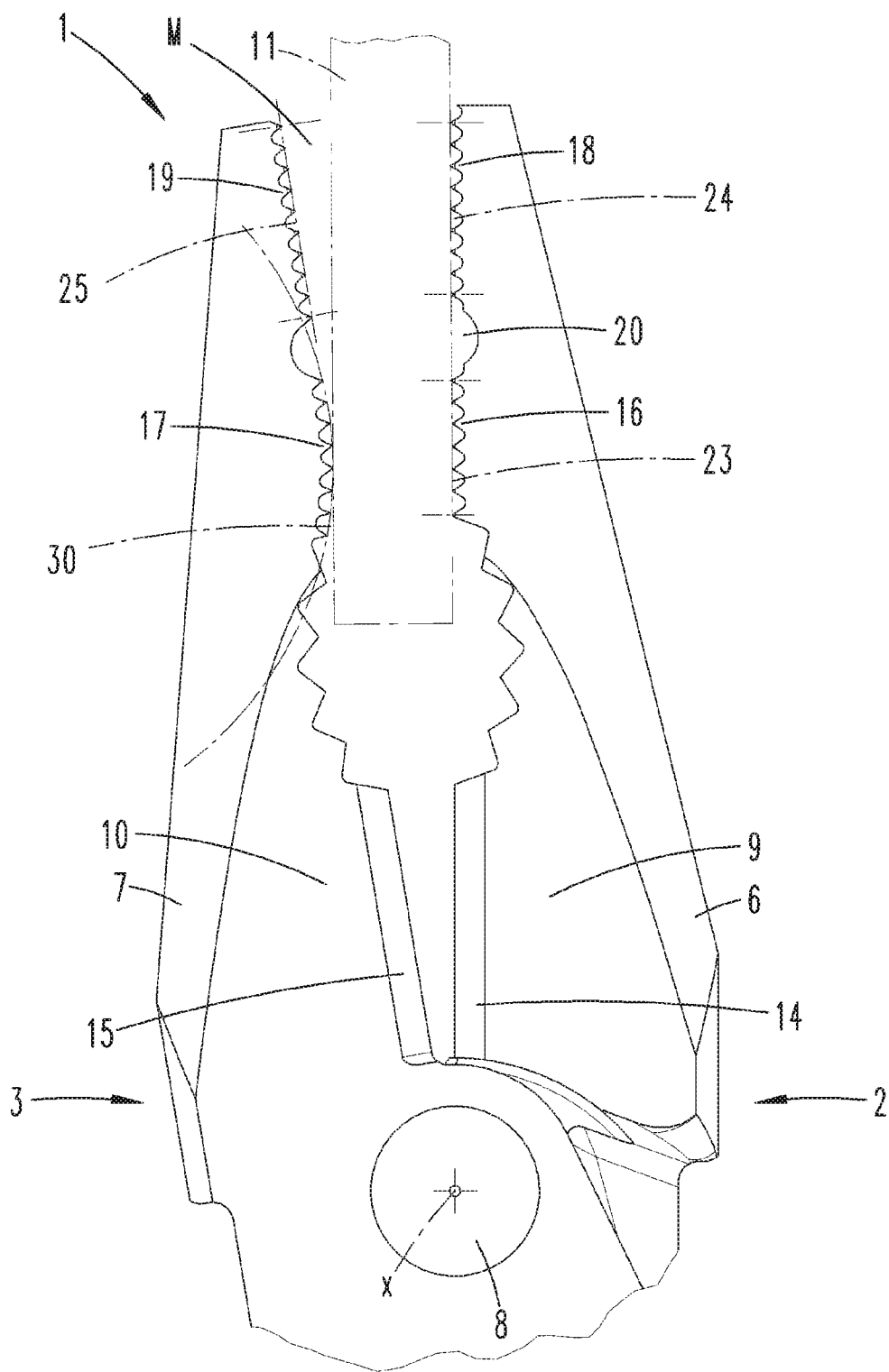
FIG. 4 shows an illustration corresponding to FIG. 3 during gripping of a sheet-shaped workpiece by the working regions at the pliers.

The tooth tips 22, in particular in the toothed region 16, contact in a sequence in the longitudinal extent of the respective pliers jaw member 6 a surrounding surface 23 that is flat as viewed in longitudinal cross-section or in a longitudinal view according to FIG. 3. In the closing position of the pliers jaw according to FIG. 3 or in the course of closing the pliers jaw, this flat surrounding surface 23 is brought into a parallel orientation with respect to the axis of symmetry y immediately before reaching the closing position of the pliers jaw member according to FIG. 7.

Figure 6:
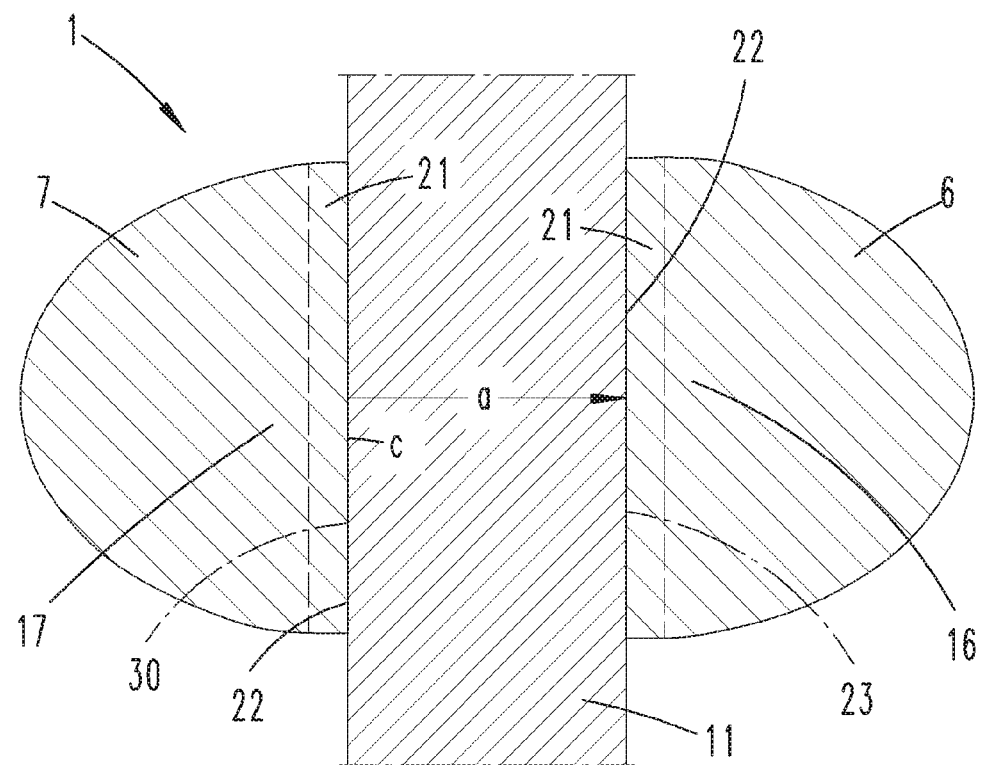
FIG. 6 shows the section according to the line VI-VI in FIG. 5.

As can be seen from the illustration in FIG. 6, the surrounding surface 23, which contacts all tooth tips of the one region 16, also extends transversely to the longitudinal extent of the pliers jaw member 6 in a flat area.

A further (upstream) toothed region 18 of the pliers jaw member 6 provided according to the illustrations in FIGS. 1 to 7 contacts with its tooth tips 22 a likewise flat surrounding surface 24, which, as is preferred, can extend in the same plane as the surrounding surface 23 of the toothed region 16.

In a preferred configuration, a toothed region 19 of the other pliers jaw member 7 opposite the toothed region 18 is configured identically with respect to the alignment of the teeth 21 and the hereby resulting surrounding surface 25 so that the surrounding surface 25 spans a plane which, in the closing position of the pliers jaw, is aligned at least approximately parallel to the corresponding surrounding surface 24 of the toothed region 18.

The further toothed regions 26 and 27 facing the joint bolt 8 in the exemplary embodiment shown in FIG. 9 can likewise have such flat surrounding surfaces 28 and 29. In the closing position of the pliers jaw shown, they are preferably aligned parallel to the axis of symmetry y.

Figure 2:
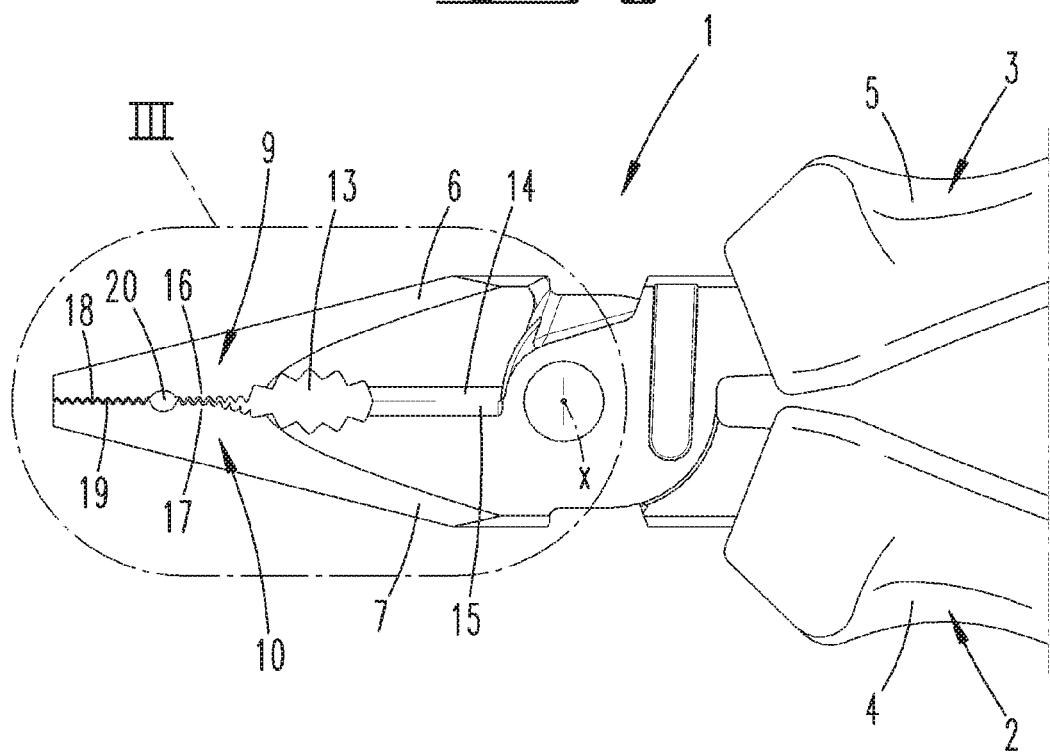
FIG. 2 shows pliers in an enlarged view regarding working regions of the pliers in a closed position of the pliers jaw.

Deviating from the arrangement of the teeth 21 and the accompanying flat surrounding surface configuration of the toothed region 16 and moreover, optionally, the toothed regions 18 and 19 and/or 26 and 27, the toothed region 17 opposite the toothed region 16 is formed in the region of the pliers jaw member 7 in such a manner that with respect to a longitudinal cross-section or a view according to the FIG. 2, 8 or 9, the tooth tips 22 of these teeth 21 end in a convex surrounding surface 30. Viewed transversely to this, the surrounding surface 30 extends flat in the cross-section according to FIG. 6, preferably aligned parallel to the cross-sectional orientation of the opposite surrounding surface 23.

Figure 5:
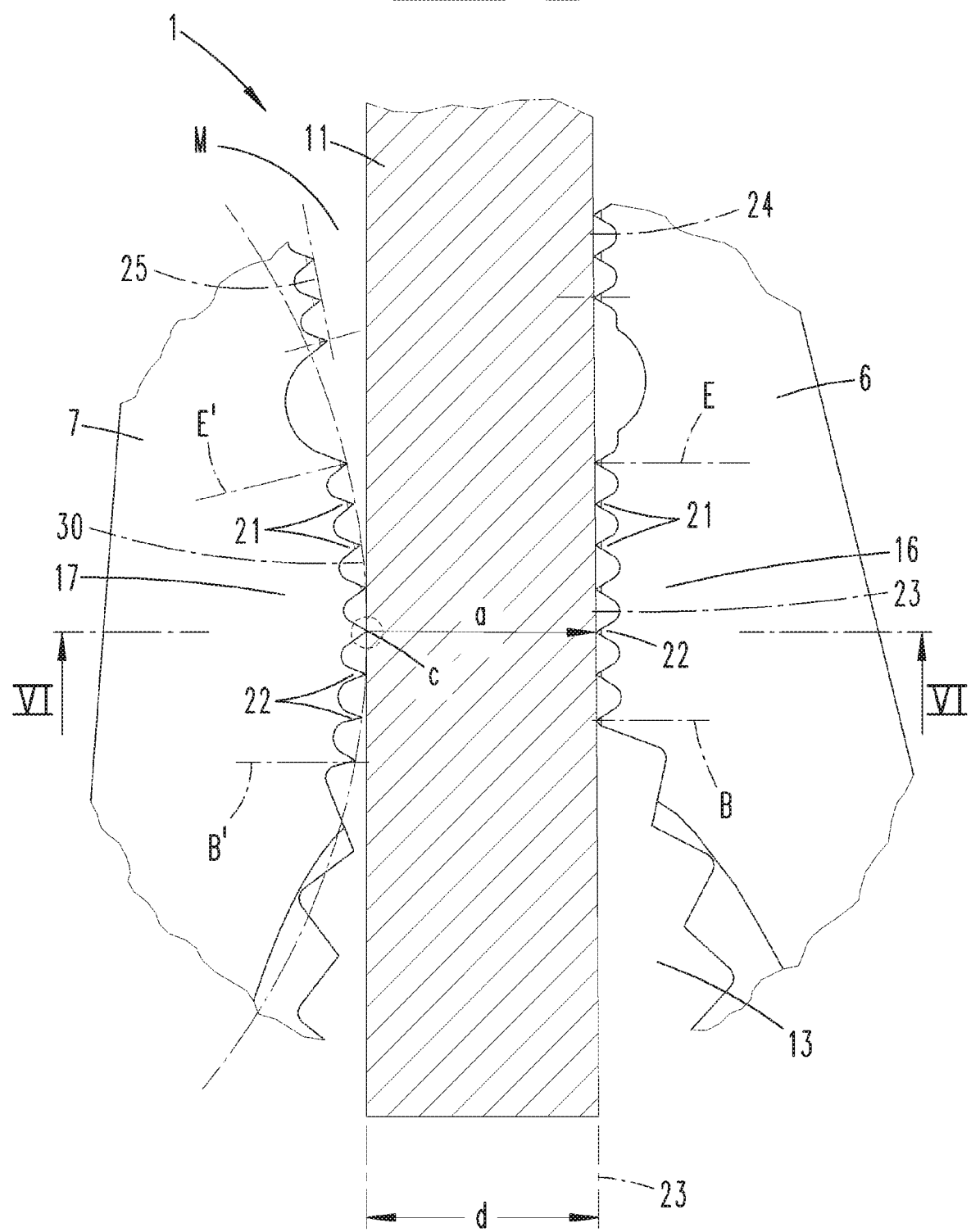
FIG. 5 shows the enlarged detail of the region V in FIG. 4.

As can be seen in particular from the enlarged illustration in FIG. 5, the surrounding surface 30 in the longitudinal representation extends along a section of a circular arc.

As viewed starting from the joint bolt 8 towards the free end of the pliers jaw members 6 and 7, each toothed region 16 and 17 has a beginning B, B' and an end E, E' with regard to the surrounding surfaces 23 and 30, respectively.

The arrangement of the teeth 21 in the toothed region 17 is preferably selected in such a manner that with the pliers jaw M closed, the circular section line of the surrounding surface 30 in the region of the end E' runs at least approximately tangentially into the surrounding surface 23 of the first toothed region 16.

In the case of a flat workpiece 11 clamped between the pliers jaw members 6 and 7, the result is a flat surface support facing the first toothed region 16 on preferably all tooth tips 22 of this region 16. Opposite thereto, viewed transversely to the longitudinal extent of the pliers jaw member, a line-like support of the pliers jaw member 7 in the convexly curved region 17 is given. Furthermore, in the region of the tooth tip 22 supported on the facing surface of the workpiece 11, the result is a contact line c, directed transversely to the longitudinal extent of the jaw.

The result for workpieces 11 with a maximum permissible thickness d for these pliers 1 is an alignment of the contact line c opposite the region 16 or the surrounding surface 23 given here.

A force introduced into the workpiece 11 via the pliers jaw member 7 and the tooth 21 acting on the facing surface of the workpiece 11 in the region of the contact line c acts via the workpiece 11 in the region 16 between the beginning B thereof and the end E thereof, further preferably in the region of the first half of region 16 as viewed from the beginning B thereof (cf. FIG. 5, arrow a).

When projecting the contact line c along the arrow a in the direction of the first toothed region 16, the contact line c for a clamped workpiece 11 up to the maximum thickness dimension of the workpiece 11 provided for these pliers 1 is located in the region of the first half of the extent of the region 16, i.e. in the region between the beginning B and the middle given between the beginning B and the end E.

Figure 7:
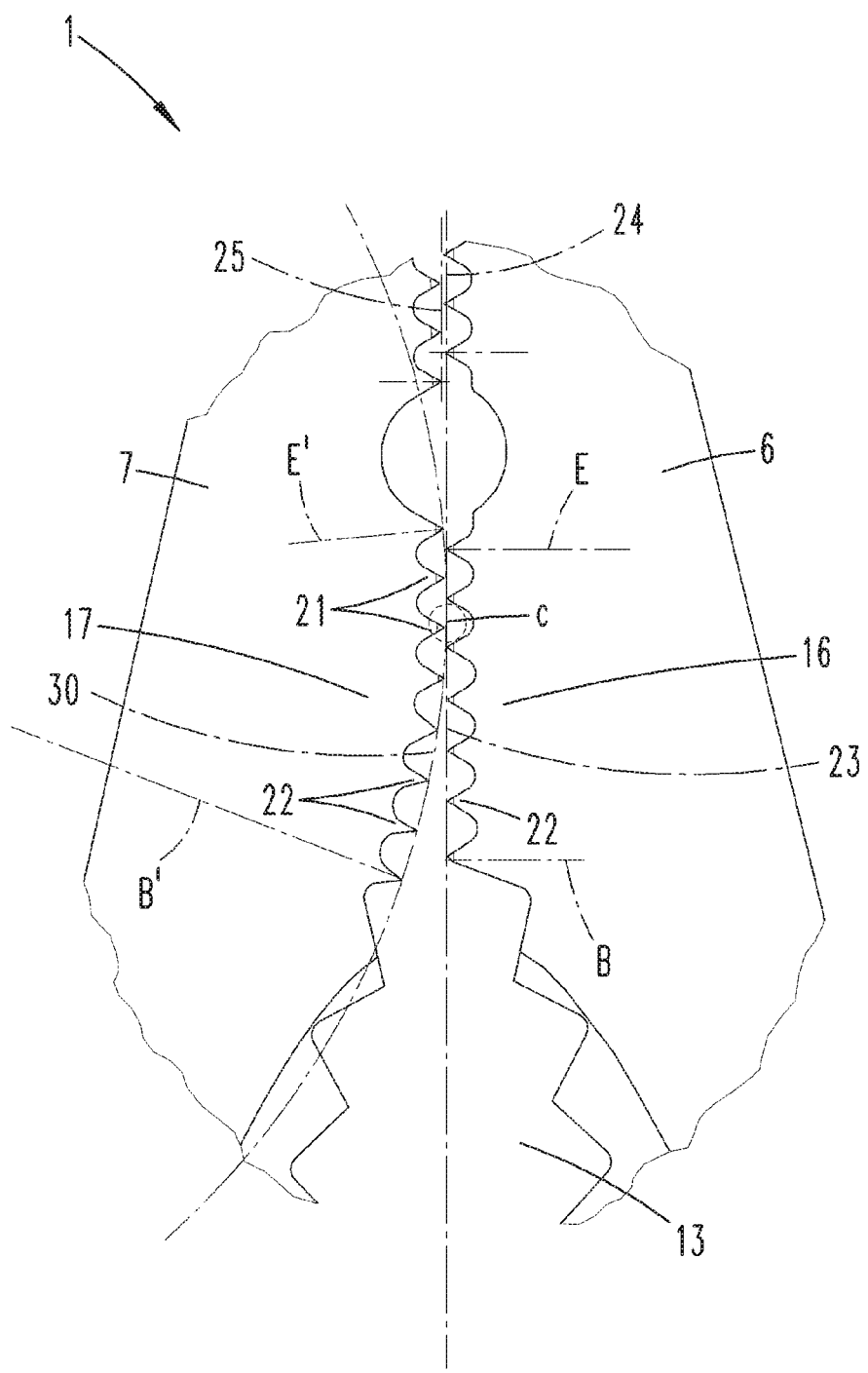
FIG. 7 shows an illustration corresponding to FIG. 5, but regarding the closed position of the pliers jaw.

Without a clamped workpiece and with direct contact with the surrounding regions 23 and 30 according to the illustration in FIG. 7, the result is a point of the surrounding surface 30 that protrudes the furthest, which point is located centrally or in that half of the longitudinal extent of the second toothed region 17 that faces the end E', between its beginning B' and its end E'.

As can be seen from the illustration in FIG. 9, one of the two toothed regions 18, 19 possible at the tip of the pliers jaw members 6, 7 may also have a convex surrounding surface 31 in which the respective tooth tips end. Thus, the fourth toothed region 19 can be configured as described above, while the tooth tips 22 of the opposite toothed region 18 end in a flat surrounding surface 24.

Also, in the closing position of the pliers, the convex surrounding surface 31 can run at least approximately tangentially into the flat surrounding surface 24.

Both convex surrounding surfaces 30 and 31 can be formed on the same pliers jaw member 6 or 7, as illustrated. Alternatively, one surrounding surface 30 can be formed on one pliers jaw member and the other one on the other pliers jaw member.

The foregoing explanations serve to explain the inventions covered by the present application as a whole, which, at least through the following feature combinations, in each case also independently, further refine the prior art, namely:

Pliers, which are characterized in that in the first toothed region 16, as viewed in a sequence in the longitudinal extent of the pliers handle 2, 3, the tooth tips 22 end in a surrounding surface 23 that is flat in the longitudinal cross-section and in contact with same, and that the tooth tips 22 of the opposing second toothed region 17 end in a surrounding surface 30 that is convex in the longitudinal cross-section and that is in contact with same.

Pliers, which are characterized in that in the course of closing the pliers 1, a contact line c resulting between the surrounding surfaces 23 and 30 is offset with respect to a beginning B of the toothing towards the free end of the pliers handle 2, 3.

Pliers, which are characterized in that, with regard to a longitudinal extent of the pliers jaw member 6, 7, the point of the convex surrounding surface 23, 30 which protrudes furthest towards the opposite working region 9 when the surrounding surfaces 23, 30 of the first and the second toothed regions 16, 17 come into contact with one another in a longitudinal cross-section is arranged approximately in the middle of the second toothed region 17.

Pliers, which are characterized in that in the direction of the free ends of the pliers handles 2, 3 upstream of the first and second toothed regions 16, 17, third and fourth toothed regions 18, 18 are formed which are separated from the first and second toothed regions 16, 17 by a hole structure 20 that is given when the pliers jaw M is closed.

Pliers, which are characterized in that the tooth tips 22 of the third and fourth toothed regions 18, 19 each end in a surrounding surface 24, 25 that contacts the tooth tips 22 and is flat in longitudinal cross-section.

Pliers, which are characterized in that the tooth tips 22 of the third toothed region 18 end in a flat surrounding surface (24) contacting them and the tooth tips of the fourth toothed region 19 end in a convex surrounding surface 31 contacting them.

All features disclosed (in themselves but also in combination among each other) are pertinent for the invention. The disclosure content of the associated/accompanying priority documents (copy of the prior application) is also hereby included in full in the disclosure, including for the purpose of incorporating features of these documents in claims of the present application. The subsidiary claims in their optional subordinated formulation characterize independent inventive refinement of the prior art, in particular to undertake divisional applications based on these claims.

REFERENCE LIST

1 Pliers
2 Pliers handle
3 Pliers handle
4 Gripping handle
5 Gripping handle
6 Pliers jaw member
7 Pliers jaw member
8 Joint bolt
9 Working region
10 Working region
11 Workpiece
12 Longitudinal slot
13 Gripping structure
14 Cutting edge
15 Cutting edge
16 First toothed region
17 Second toothed region
18 Third toothed region
19 Fourth toothed region
20 Hole structure
21 Tooth
22 Tooth tip
23 Surrounding surface
24 Surrounding surface
25 Surrounding surface
26 Toothed region
27 Toothed region
28 Surrounding surface
29 Surrounding surface
30 Surrounding surface
31 Surrounding surface
a Arrow
c Contact line
d Thickness
x Joint axis
y Axis of symmetry
B Beginning
B' Beginning
E End
E' End
M Pliers jaw

The invention claimed is:

1. Pliers (1) having two pliers handles (2, 3) guided such that they cross one another in a joint region having a stationary joint bolt (8), wherein gripping regions are formed on the pliers handles (2, 3) on one side of the joint region, and working regions (9, 10) are formed on free ends of the pliers handles (2, 3) on the other side, said working regions complement each other to form a pliers jaw (M), wherein the working regions (9, 10) further have first and second toothed regions (16 and 17) that come into contact when the pliers jaw (M) is closed, and the opposing first and second toothed regions (16, 17) are shaped differently in a longitudinal extension thereof, wherein in the first toothed region (16), viewed in a sequence in a longitudinal extent of the pliers handle (2, 3), the tooth tips (22) end in a surrounding surface (23) that is flat in a longitudinal cross-section and in contact with same, and that tooth tips (22) of the opposing second toothed region (17) end in a surrounding surface (30) that is convex in the longitudinal cross-section and in contact with same, > wherein with regard to a longitudinal extent of the pliers jaw member (6, 7), a point of the convex surrounding surface (30) which protrudes furthest towards an opposite working region (9) when the surrounding surfaces (23, 30) of the first and the second toothed regions (16, 17) come into contact with one another in a longitudinal cross-section is arranged in a half of the flat surrounding surface (23) located toward the free end of the respective working region.

2. The pliers according to claim 1, wherein in the course of closing the pliers (1), a contact line (c) resulting between the surrounding surfaces (23 and 30) is offset with respect to a beginning (B) of the toothing towards the free end of the pliers handle (2, 3).

3. The pliers according to claim 1, wherein in the direction of the free ends of the pliers handles (2, 3) upstream of the first and second toothed regions (16, 17), third and fourth toothed regions (18, 19) are formed which are separated from the first and second toothed regions (16, 17) by a hole structure (20) that is given when the pliers jaw (M) is closed.

4. The pliers according to claim 3, wherein the tooth tips (22) of the third and fourth toothed regions (18, 19) each end in a surrounding surface (24, 25) that contacts the tooth tips (22) and is flat in longitudinal cross-section.

5. The pliers according to claim 3, wherein the tooth tips (22) of the third toothed region (18) end in a flat surrounding surface (24) contacting them and the tooth tips (22) of the fourth toothed region (19) end in a convex surrounding surface (31) contacting them.

\* \* \* \* \*